US009843386B2

(12) United States Patent
Baggen et al.

(10) Patent No.: US 9,843,386 B2
(45) Date of Patent: Dec. 12, 2017

(54) RECEIVING CODED VISIBLE LIGHT IN PRESENCE OF INTERFERENCE

(71) Applicant: PHILIPS LIGHTING HOLDING B.V., Eindhoven (NL)

(72) Inventors: Constant Paul Marie Jozef Baggen, Blerick (NL); Paul Henricus Johannes Maria Van Voorthuisenh, Sint Oedenrode (NL); Erik Witberg, Breda (NL); Hongming Yang, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/785,420

(22) PCT Filed: Apr. 10, 2014

(86) PCT No.: PCT/IB2014/060615
§ 371 (c)(1),
(2) Date: Oct. 19, 2015

(87) PCT Pub. No.: WO2014/170804
PCT Pub. Date: Oct. 23, 2014

(65) Prior Publication Data
US 2016/0087719 A1 Mar. 24, 2016

(30) Foreign Application Priority Data
Apr. 19, 2013 (EP) ..................................... 13164442

(51) Int. Cl.
*H04B 10/116* (2013.01)
*H04B 10/61* (2013.01)

(52) U.S. Cl.
CPC ......... *H04B 10/116* (2013.01); *H04B 10/616* (2013.01)

(58) Field of Classification Search
USPC .................................................. 398/119, 120
See application file for complete search history.

(56) References Cited

U.S. PATENT DOCUMENTS

| 4,507,794 A | 3/1985 | Jones et al. | |
|---|---|---|---|
| 2008/0260006 A1* | 10/2008 | Luo | ....................... H04B 1/7087 375/148 |

(Continued)

OTHER PUBLICATIONS

Hongming Yang, Illumination Sensing in LED Lighting Systems Based on Frequency-Division Multiplexing,IEEE Transactions on Signal Processing, vol. 57, No. 11, Nov. 2009, pp. 4269-4280.*

(Continued)

*Primary Examiner* — Danny Leung
*Assistant Examiner* — Omar S Ismail
(74) *Attorney, Agent, or Firm* — Meenakshy Chakravorty

(57) ABSTRACT

A coded visible light receiver comprises: a sensor, a transform module, and an interference cancelling module. The sensor receives light comprising data modulated into the light according to a coding scheme. The transform module is configured to transform the data into a frequency domain representation, representing a band of a spectrum resulting from the data being modulated into the light according to the coding scheme. The interference cancelling module is configured to cancel interference occurring in the band of the data, by determining one or more components in the band that exceed a threshold signal strength and cancelling those components.

18 Claims, 6 Drawing Sheets

(56) References Cited

U.S. PATENT DOCUMENTS

| | | | | |
|---|---|---|---|---|
| 2010/0246637 | A1* | 9/2010 | Miyatani | H04J 11/0063 375/130 |
| 2011/0229147 | A1 | 9/2011 | Yokoi | |
| 2013/0126713 | A1* | 5/2013 | Haas | H04B 10/116 250/208.2 |
| 2013/0202310 | A1* | 8/2013 | Rietman | H04B 10/116 398/128 |
| 2013/0216240 | A1* | 8/2013 | Fukuchi | H04B 10/6161 398/208 |
| 2014/0029952 | A1* | 1/2014 | Liu | H04B 10/116 398/115 |
| 2014/0290138 | A1* | 10/2014 | Oshima | H04B 10/11 49/25 |

OTHER PUBLICATIONS

Hongming Yang, Illumination Sensing in LED Lighting Systems Based on Frequency-Division Multiplexing—IEEE Transactions on Signal Processing, vol. 57, No. 11, Nov. 2009—pp. 4273-4276.*

DiPietro, Robert, "An FFT Based Technique for Ssuppressing Narrow-Band Interference in PN Spread Spectrum Communications Systems," IEEE, 1989 (4 pages).

Kumpumäki, Timo, et al., "Narrow-Band Interference Rejection Using Transform Domain Signal Processing in a Hybrid DS/FH Spread-Spectrum System," IEEE, 1997 (5 pages).

Langer, K.D., et al., "Implementation of a 84 Mbit/s Visible-Light Link Based on Discrete-Multitone Modulation and LED Room Lighting," Communication Systems Networks and Digital Signal Processing (CSNDSP), 2010 (4 pages).

Mao, Wei-Lung, et al., "Design of Narrowband Interference Canceller in GPS Receiver Using FFT Technique," Far East Journal of Electronics and Communications, vol. 2, No. 3, Dec. 2008 (19 pages).

Ntogari, G., et al., "Combining Illumination Dimming Based on Pulse-Width Modulation with Visible-Light Communications Based on Discrete Multitone," J. Opt. Commun. Netw., vol. 3, No. 1, Jan. 2011 (10 pages).

Young, Jeffrey A., "Performance Metrics for Windows Used in Real-Time DFT-Based Multiple-Tone Frequency Excision," IEEE Transactions on Signal Processing, vol. 47, No. 3, Mar. 1999 (13 pages).

Young, Jeffrey A., "Analysis of DFT-Based Frequency Excision Algorithms for Direct-Sequence Spread—Spectrum Communications," IEEE Transactions on Communications, vol. 46, No. 8, Aug. 1998 (12 pages).

* cited by examiner

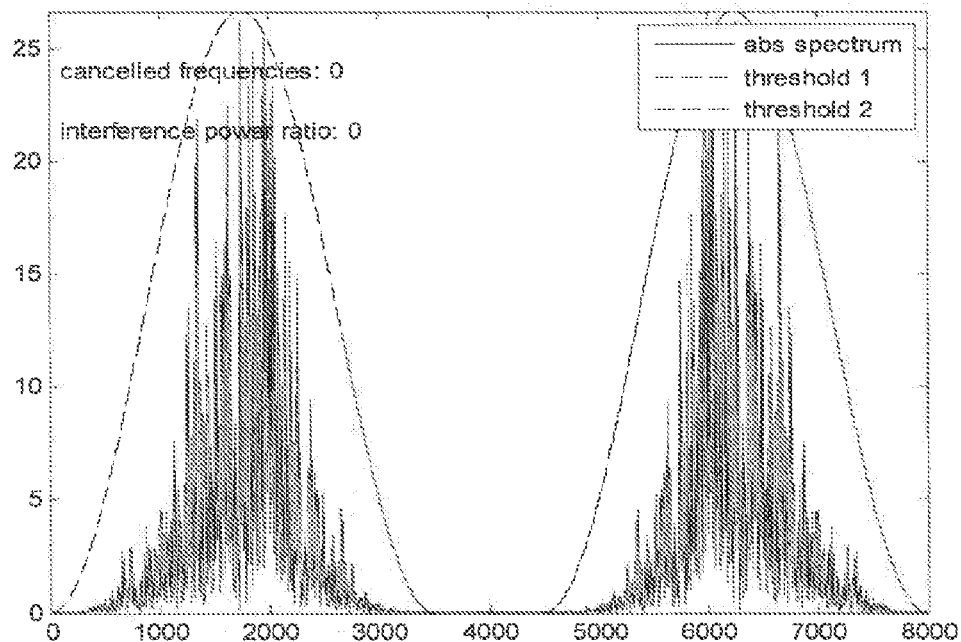
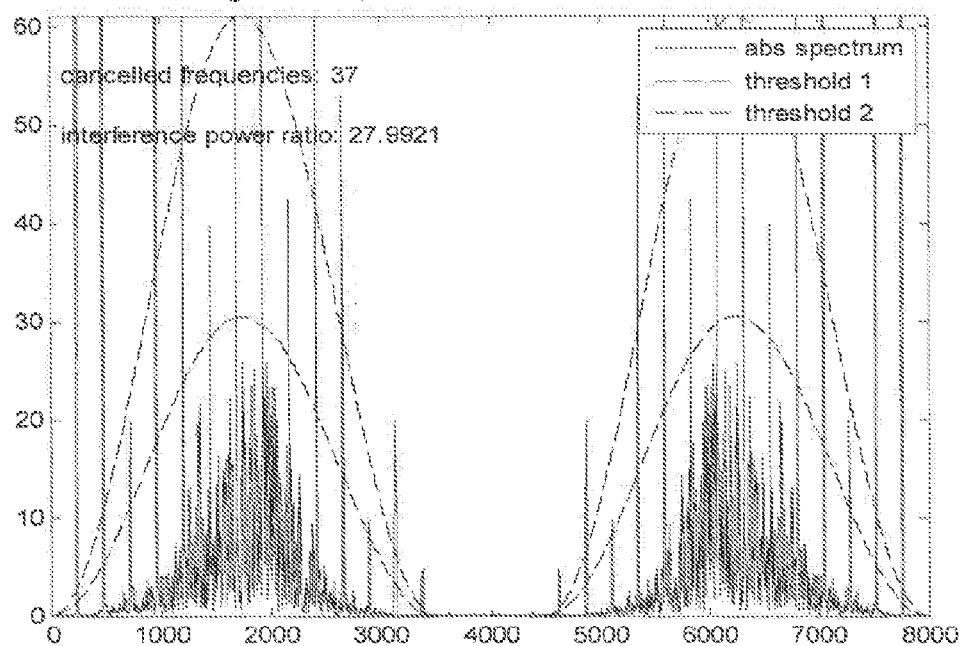

RECEIVING CODED VISIBLE LIGHT IN PRESENCE OF INTERFERENCE

CROSS-REFERENCE TO PRIOR APPLICATIONS

This application is the U.S. National Phase application under 35 U.S.C. §371 of International Application No. PCT/IB2014/060615, filed on Apr. 10, 2014, which claims the benefit European Patent Application No. 13164442.9, filed on Apr. 19, 2013. These applications are hereby incorporated by reference herein.

TECHNICAL FIELD

The present disclosure relates to interference that may be present when receiving coded visible light, and to mitigating an effect of such interference.

BACKGROUND

Coded light refers to a technique whereby data is modulated into the visible illumination emitted by a light source, e.g. by an LED based luminaire. Thus in addition to providing illumination (for which purpose a light source may already be present in an environment), the light source also acts as a transmitter capable of transmitting data to a suitable receiver of coded light. The modulation is typically performed at a high enough frequency that it is imperceptible to human vision, i.e. so the user only perceives the overall illumination and not the effect of the data being modulated into that illumination. In this way the data may be said to be embedded into the light from the light source.

An example of a coded light system is presented in "Implementation of a 84 Mbit/s Visible-Light Link based on Discrete-Multitone Modulation and LED Room Lighting", by K. D. Langer published in Communication Systems Networks and Digital Signal Processing (CSNDSP), 2010. This document presents an implementation of a 84 Mbit/s optical wireless link based on commercially available LED luminaires. The paper discloses how a quasi-error-free data transmission was accomplished over typical indoor distances, e.g., between ceiling lamp and writing desk, by use of discrete-multitone modulation.

Coded light can be used in a number of applications. For instance, one application is to communicate between luminaires, e.g. as part of an intelligent lighting system. Each of a plurality of luminaires in an indoor or outdoor environment may be equipped with both a coded light transmitter and receiver, and the ability to communicate between them via coded light may be used to control the light in the environment in an at least partially distributed fashion. E.g. each luminaire may also be equipped with a presence sensor to detect presence of a being (typically a human), and information may be shared between two or more or the luminaires in order to determine how to control the light from the different luminaires in dependence on the detected presence.

In another example application, coded light may be used to provide information from a luminaire to a remote control unit for controlling that luminaire, e.g. to provide an identifier distinguishing it amongst other such luminaires which the remote unit can control, or to provide status information on the luminaire (e.g. to report errors, warnings, temperature, operating time, etc.). In one such example, the remote control unit may comprise a mobile user terminal such as smart phone or tablet having an inbuilt camera or other light sensor. With the terminal running a suitable application, the user can direct the camera at a luminaire and thereby detect the identifier coded into the light from that luminaire. Given the identifier of the luminaire it is looking at, the terminal may then control that luminaire by sending back a return signal (e.g. via RF).

In yet further applications the coded light may be used to provide information to a user, e.g. to provide identifiers of the luminaires for use in commissioning, or to enable provision of location related information. For example each luminaire in an indoor and/or outdoor environment (e.g. in the rooms and corridors of an office complex, and/or paths of a campus) may be arranged to emit light embedded with a respective identifier identifying it within that environment. If a user has a mobile terminal equipped with a camera or other light sensors, and an associated application for detecting coded light, the terminal can detect the identifier of a luminaire illuminating its current location. This can then be used to help the user navigate the environment, by looking up the current location in location database mapping the identifiers to locations of the luminaires. Alternatively or additionally, this may be used to look up information associated with the user's current location, such as information on exhibits in particular rooms of a museum. E.g. the look up may be performed via the Internet or a local network to which the terminal has access, or from a local database on the user terminal. Alternatively the information could be directly coded into the light from one or more luminaires. Generally speaking, the applicability of coded light is not limited.

One way to implement coded light is by amplitude keying, by switching the amplitude or power of the emitted light between discrete levels in order to represent channel bits (or more generally channel symbols). For instance in the simplest case, when the light source is on (emitting) this represents a channel bit of value 1 and when the light source is off (not emitting) this represents a channel bit of value 0, or vice versa. A photo sensor in the coded light receiver can detect when the light is on or off, or distinguish between the different levels, and thereby receive the channel bits or symbols.

In order to communicate data, the modulation typically involves a coding scheme to map data bits (sometimes referred to as user bits) onto channel bits. An example is a conventional Manchester code, which is a binary code whereby a user bit of value 0 is mapped onto a channel symbol off-on (channel bits 0 and then 1) and a user bit of value 1 is mapped onto a channel symbol on-off (channel bits 1 and then 0), or vice versa. The coding has at least two possible purposes. Firstly, as will be familiar to a person skilled in the art, in many coding schemes like Manchester coding, it allows the clock and data to be recovered from the same signal (otherwise a separate clock would have to be sent or the transmitter and receiver would have to be assumed to be perfectly synchronized). Secondly, it may have the effect of modifying the spectrum of the transmitted signal.

It has been noted that coded light is susceptible to interference from certain low-frequency sources such as the mains power supply (50 Hz or 60 Hz in most countries). Existing coded light techniques attempt to avoid parts of the spectrum where interference occurs (sometimes referred to as spectral confinement). Codes such as the Manchester code may be chosen for their effect of suppressing the spectral density curve of the transmitted signal at lower frequencies, thus avoiding regions of low frequency interference.

SUMMARY

However, even avoiding low frequencies, there is an additional problem of in-band interference from other sources. In many scenarios, this may comprise one or more potentially strong spikes of interference which may sit in an unavoidable region of the wanted signal's spectrum.

For instance, interference may originate from the backlight of a display screen which may be pulse width modulated in order to control its brightness. The pulse width modulation (PWM) means the light output from the display takes the form of a constant or quasi-constant rectangular wave in the time domain, corresponding to a fundamental tone and a series of discrete harmonics in the frequency domain. In another example, pulse width modulation or sinusoidal modulation may be found in one or more other luminaires or light sources in the same environment, other than that emitting the desired data. In some situations the interference may even be one or more orders of magnitude stronger than the wanted signal, e.g. if the coded light sensor sees the interfering source directly whilst the wanted signal is only seen via a reflection from a surface such as a wall, floor or desk.

The present invention provides for cancellation of potentially strong in-band interferers, such as PWM back lights or other periodic interferers. In the frequency domain, it is possible to distinguish between the continuous spectrum of a coded light signal modulated with (effectively) random data, and one or more interfering spikes such as found in the discrete tone spectrum of periodic interferers. By removing the discrete tone spectrum of the interferers from the composite spectrum, coded light signals can be more reliably detected in the presence of interferers.

Hence according to one aspect the disclosure herein, there is provided a coded light receiver comprising a light sensor, a transform module, and an interference cancelling module. The sensor receives light having data modulated into it according to a coding scheme. The transform module is configured to transform the data into a frequency domain representation, representing a band of a spectrum resulting from said data being modulated into the light according to said coding scheme. The interference cancelling module is configured to cancel interference occurring in this band, by determining one or more components in the band that exceed a threshold signal strength and cancelling these components.

According to another aspect there is provided a computer program product comprising code embodied on a computer readable medium and being configured so as when executed on a processor to operate a coded light receiver to perform interference cancelling in accordance with the disclosure herein.

BRIEF DESCRIPTION OF THE DRAWINGS

For a better understanding of the present disclosure and to show how embodiments may be put into effect, reference is made by way of example to the accompanying drawings in which:

FIG. 5 is a schematic representation of a spectrum of a wanted signal and a threshold mask in presence of no interference, FIG. 6 is a schematic representation of a spectrum of a wanted signal and threshold mask in presence of interferers.

DETAILED DESCRIPTION OF EMBODIMENTS

Figure 1:
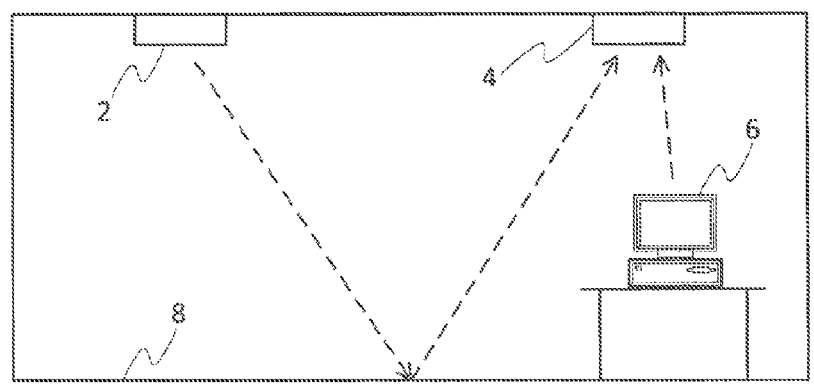
FIG. 1 is a schematic illustration of an environment comprising coded light and interference.

FIG. 1 illustrates an example of an environment in which the interference cancelling disclosed herein may be employed, e.g. an office, home or other room or indoor space. The environment comprises a coded light transmitter 2 such as a luminaire, e.g. mounted on a ceiling or wall, installed for the primary purpose of illuminating the environment but also having the secondary function of providing data embedded into the illumination output using coded light techniques. The environment further comprises a coded light receiver 4. For example, the coded light receiver 4 may be included in another luminaire, e.g. as part of an intelligent lighting system. Alternatively the coded light receiver 4 may be a component of a remote control unit for controlling the transmitting luminaire 2, or of a user terminal such as mobile user terminal for deriving information from the transmitting luminaire 2 (such as location related information or information for use in commissioning).

Typically, the light of the transmitting luminaire 2 reaches the receiver 4 via one or more reflections from one or more surfaces 8 such as the floor or walls. With increasing distance between the lamp of the transmitting luminaire 2 and the receiver 4, the received signal strength at the receiver 4 decreases. For example at an extreme range of coded light communication, the visible light signal may be received with an amplitude of about 0.1 Lux.

In a typical user scenario, there may be one or more other light sources 6 present that generate interference, e.g. a display screen such as that of a laptop computer (especially if they are dimmed), the backlighting of a TV screen, and/or another luminaire that is dimmed using pulse width modulation (PWM). The interference is often in-band (e.g. between 0 and 4 kHz), and the amplitude of the interference at the detector of the receiver 4 can be much larger than the signal amplitude at the extreme range of coded light communication (say 10 to 20 dB stronger, e.g. of the order of 1 Lux). For example, the detector may "look" directly to the interference source 6 while the coded light is only seen indirectly via one or more reflections.

The interference generated by such sources 6 may be periodic in nature, resulting in one or more distinct interfering tones in the spectrum of the coded light data being communicated from the transmitter 2.

Figure 2:
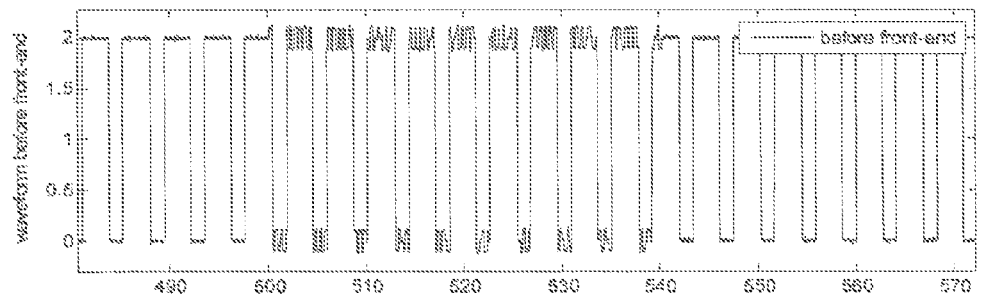
FIG. 2 is a schematic representation of a received signal at a coded light receiver.

For example, a pulse width modulated interferer 6 such as a PWM display screen will generate a rectangular wave in the time domain with a constant (or quasi constant) duty cycle. An example is illustrated in FIG. 2, wherein the signal received at the detector comprises a coded packet plus rectangular wave interference from a pulse width modulated source (in this example the PWM interference is at 240 Hz, with the duty cycle 66%, signal-to-interference ratio −20 dB, and the packet present between 500 and 540 ms). The transform (e.g. Fourier transform) of a rectangular wave in the frequency domain is made up of a fundamental and a series of harmonics, and so the rectangular PWM interference corresponds to a series of narrow interfering tones or "spikes" in the frequency domain (e.g. see FIG. 6).

In another example, another luminaire or light source in the same environment may be modulated according to some other scheme such as being modulated with a sinusoid, thereby resulting in an interfering tone.

The following embodiments are able to mitigate the effect of periodic interferers such as sinusoids or PWM-type of waveforms having a fixed (or quasi fixed) frequency and duty cycle in the band of interest, e.g. as in FIG. 2. In embodiments, the disclosed technique can reliably detect a physical layer coded light signal in the presence of an interferer which is 20 to 30 dB stronger than the coded light signal, or a mixture of interferers producing 20 dB more interference power than the coded light signal.

This is achieved by applying frequency-domain interference excision as a technology for removing interference from the received signal. In the frequency domain, it is possible to distinguish between the continuous spectrum of coded light signals modulated with random data, and the discrete tone spectrum of periodic interferers. For example referring to FIG. 6, a threshold curve may be determined (e.g. "threshold 2") based on the expected power spectral density (or amplitude spectral density) associated with the coding scheme being used to code the light. Any component whose signal strength (power or amplitude) is a spike exceeding the threshold curve is assumed to be an interfering tone, and is excised by setting its power or amplitude to zero. By removing the discrete tone spectrum of the interferers from the composite spectrum (excision), it can be possible to reliably detect coded light signals in the presence of interferers which are more than 20 dB stronger than the wanted signal.

The interference cancellation exemplified in FIG. 6 will be explained in more detail shortly, but first an example of a receiver 4 and coding scheme are discussed.

Figure 3:
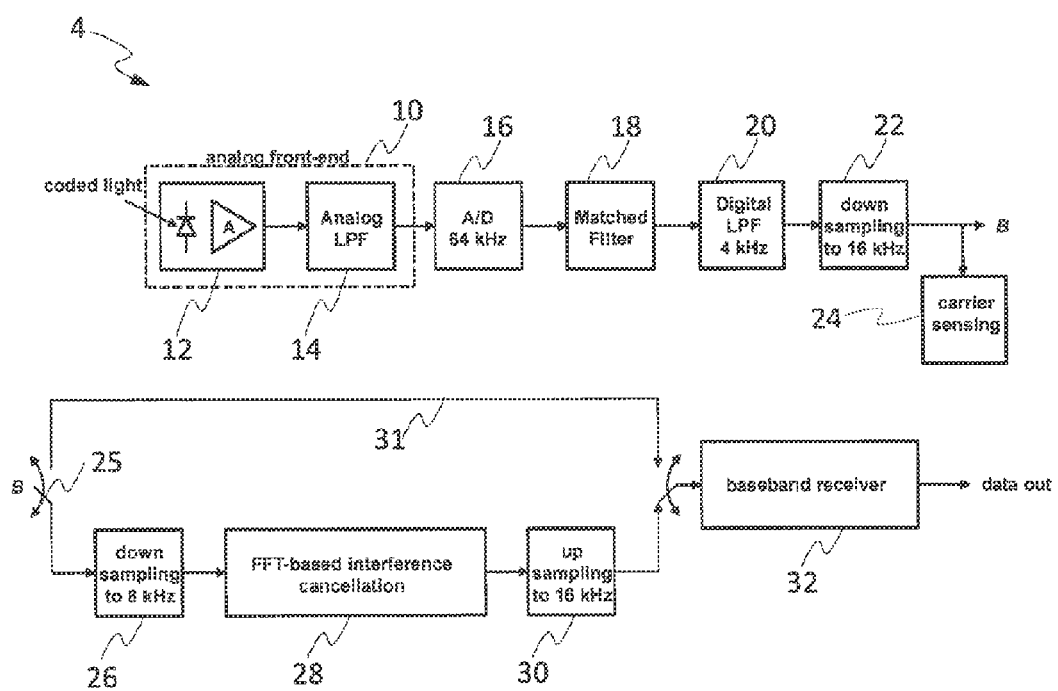
FIG. 3 is a schematic block diagram of a coded light receiver.

FIG. 3 gives an example block diagram of a coded light receiver 4, configured to use frequency-domain interference excision in accordance with embodiments of the present disclosure. The receiver 4 comprises an analogue front-end 10, comprising a light sensor 12 and an analogue low pass filter (LPF) 14. The receiver further comprises an analogue to digital (A/D) converter 16, a matched filter 18, a digital low pass filter (LPF) 20, a first down-sampling module 22, a carrier sensing module 24, a switch 25, a second down-sampling module 26, an interference cancellation module 28, an up-sampling module 30, a bypass path 31, and a baseband module 32. The light sensor 12 has an output coupled to an input of the analogue LPF 14. In turn, the analogue LPF 14 has an output coupled to an input of the A/D converter 16, the A/D converter 16 has an output coupled to an input of the matched filter 18, the matched filter 18 has an output coupled to an input of the digital LPF 20, the digital LPF 20 has an output coupled to an input of the first down-sampling module 22, and the first down-sampling module 22 has an output coupled to an input of the carrier sensing module 24. Further, the output of the first down-sampling module 26 is coupled to the baseband module 32 via the switch 25.

When the switch 25 is asserted it couples the output of the first-down-sampling module 24 to an input of the second down-sampling module 26, and an output of the up-sampling module 30 to the input of the baseband module 32, with an output of the second down-sampling module 26 being coupled to an input of the interference cancellation module 28 and an output of the interference cancellation module 28 being coupled to an input of the up-sampling module 30. When the switch 25 is de-asserted, it couples the output of the first down-sampling module 24 directly to the input of the baseband module 32 via the bypass path 31, bypassing the second down-sampling module 26, interference cancellation module 28 and up-sampling module 30.

Each of the digital components 18, 20, 22, 24, 26, 28, 30 and 32 may be implemented in software stored on a storage device of the receiver 4 and arranged for execution on a processor of the receiver 4. Alternatively some of all of these components may be implemented in dedicated hardware circuitry, or configurable hardware circuitry such as an FPGA, or a combination of software and hardware.

In operation, the light sensor 12 receives incoming light comprising a coded light signal from the transmitter 2 and potentially interference from one or more interference sources 6. The coded light signal comprises data coded into the light using a coding scheme for coded light. In embodiments, the coding scheme used is one of the applicant's own creation and is referred to herein as a ternary Manchester code. This is illustrated in FIGS. 13 and 14.

Figure 13:
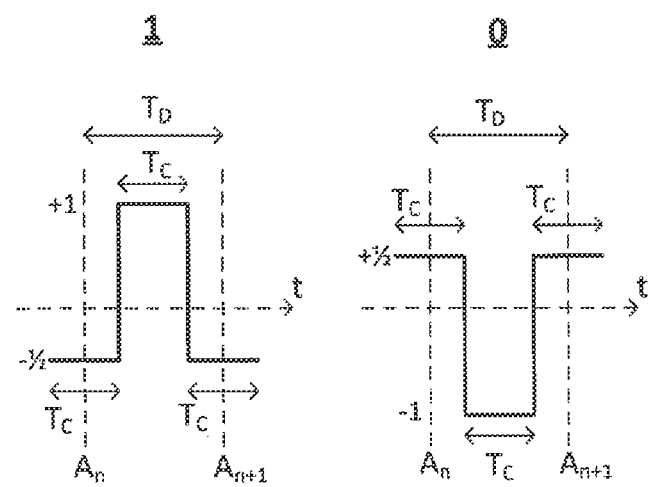
FIG. 13 is a schematic representation of the pulse wave forms of a ternary coding scheme.
Figure 14:
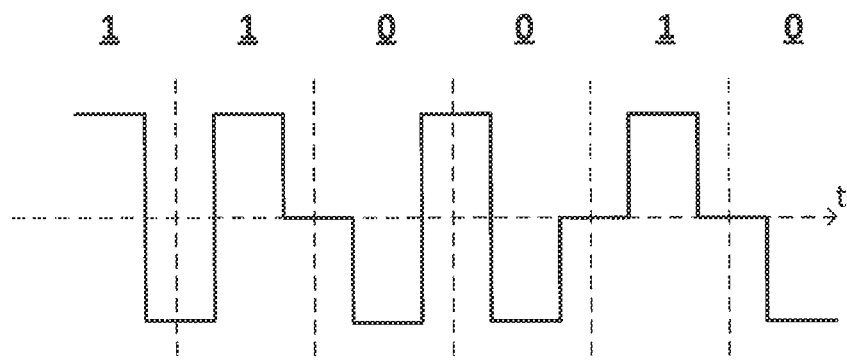
FIG. 14 is a schematic representation of a sample sequence of bits coded according to a ternary coding scheme.

According to this scheme, at the transmitter 2 each data bit to be transmitted is mapped to a composite channel symbol in the form of a respective pulse waveform, or "hat" function, as shown in FIG. 13. The pulse waveform mapped to a data bit of value 1 is shown on the left hand side of FIG. 13, and the pulse waveform mapped to a data bit of value 0 is shown on the right hand side of FIG. 13. A data bit is a bit of actual information to be transmitted, sometimes referred to as "user data" (even if not explicitly created by a user). The data bit period is labeled $T_D$ in FIG. 13, with the boundaries between user bit periods shown with vertical dashed lines.

Each hat function comprises a sequence of three elementary channel symbols of length $T_C$ in time, each half the length of the data bit period $T_D$ (i.e. $T_D=2T_C$). The three elementary channel symbols for a respective data bit are contiguous, with the middle of the three being located at the center of the respective data bit period, so that the adjacent first and third elementary channel symbols straddle the beginning and end boundaries of the data bit period respectively by half an elementary channel symbol period $T_C$ either side.

For a data bit of value 1, this is mapped to the positive hat function shown on the left of FIG. 13. The positive hat function comprises: a first elementary channel symbol of amplitude −½ unit centered on the beginning (earlier) boundary of the respective data bit period, followed by second (middle) elementary channel symbol of amplitude +1 units being centered on the respective data bit period, followed by a third elementary channel symbol of amplitude −½ centered on the end (later) boundary of the respective data bit period.

For a data bit of value 0, this is mapped to the negative hat function shown on the right of FIG. 13. The negative hat function comprises: a first elementary channel symbol of amplitude +½ unit centered on the beginning (earlier) boundary of the respective data bit period, followed by second (middle) elementary channel symbol of amplitude −1 units being centered on the respective data bit period, followed by a third elementary channel symbol of amplitude +½ centered on the end (later) boundary of the respective data bit period.

To create the coded bit stream to be transmitted, the hat functions of adjacent user bits are added to one another, offset by the locations of their respective bit periods along the time axis. Because the hat functions overlap across the boundaries between data bit periods, the functions add in the overlapping regions between adjacent data bits. That is, the hat functions are joined along the data bit period boundaries, so the earlier boundary $A_n$ of one data bit period is joined with the later bit boundary $A_{n+1}$ of the preceding adjacent data bit period, with the level of the signal being summed where the two adjacent pulse waveforms overlap. An example of a resulting sequence of channel symbols in the time domain is shown in FIG. 14.

Where two adjacent data bits are of value 1, this means the two overlapping elementary channel symbols of −½ add to −1 in the overlapping elementary period. Where two adjacent data bits are of value 0, the two overlapping elementary channel symbols of +½ add to +1 in the overlapping elementary period. Where two adjacent data bits are of different values, the two overlapping elementary channel symbols of +½ and −½ add to 0 the overlapping elementary period.

In an equivalent variant, the mapping of data bit values 0 and 1 to positive and negative hat functions may be reversed.

The resulting signal (e.g. that of FIG. 14) is then converted into a variation in the signal strength output by the transmitting light source 2 (whether represented in terms of amplitude or power). For example, elementary channel symbol −1 may be represented by a low light output level (e.g. light is turned off), the elementary channel symbol +1 may be represented by a high output light level (e.g. light is turned on), and the elementary channel symbol 0 may be represented by an intermediate light level between the high and low (e.g. the light is at half the output power or amplitude).

The ternary Manchester code can be advantageous as it provides a smoother transition when the data bits change value than a conventional Manchester code, and results in a spectrum in the frequency domain that is more suppressed around low frequencies where out-of-band interference such as mains hum may occur. However, the applicability of the present disclosure is not limited to ternary Manchester and in other embodiments other examples of suitable coding schemes may be used, e.g. a conventional (binary) Manchester code, or other conventional binary or ternary lines codes.

Whatever scheme is used, the light sensor 12 at the receiver 4 detects the light and generates an electronic signal representative of the received light level (e.g. amplitude or power) as a function of time. The light sensor outputs this electronic signal through the analogue LPF 14 to the A/D converter 16 which samples it, e.g. at 64 kHz, to produce a digital representation of the signal. Including effects of both coded light and interference, this results in a signal that might look for example something like FIG. 2.

The A/D converter 16 outputs the digital version of the signal to the matched filter 18. The matched filter 18 acts to correlate a template waveform against the received signal. The template is a pulse waveform of the coding scheme being detected, e.g. in the case of the ternary Manchester code the template may be the positive hat function shown on the left-hand side of FIG. 13. By correlating the template against what is received, this enables the matched filter 18 to detect presence of a signal based on the coding scheme associated with that template, in a manner that minimizes signal-to-noise ratio.

The matched filter 18 passes its output to the digital LPF 20 where further low-pass filtering is applied, e.g. with a 4 kHz pass band, and the digital LPF 20 passes the output of this to the first down-sampling module 22 where it is down-sampled, e.g. from 64 kHz to 16 kHz. The matched, filtered and down-sampled signal is then output to the switch 25.

If the switch 25 is de-asserted, the interference cancellation is bypassed and the signal is output straight to the baseband receiver 32 for baseband processing. The baseband processing comprises functions such as carrier sense of power surge detection, clock generation, frame sync detection, and joint clock and data recovery. If the switch 25 is asserted on the other hand, the second down-sampling module, interference cancellation module 28 and up-sampling module 30 are switched into the chain prior to the baseband processing by the base band receiver module 32. In this case, the signal is output from the first down-sampling module 22 to the second down-sampling module 26 where it is further down-sampled, e.g. from 16 kHz or 8 kHz. This down-sampled signal is output from the second down-sampling module 26 to the interference cancellation module 28 which transforms the signal from the time domain to the frequency domain and performs frequency domain interference excision in accordance with embodiments of the present disclosure. Following interference cancellation, the signal is then output from the interference cancellation module 28 to the up-sampling module 30 where it is up-sampled to reverse the down sampling by the second down-sampling module 26, e.g. back from 8 kHz to 16 kHz, then output onwards to the baseband module 32 for the baseband receive processing.

Figure 4:
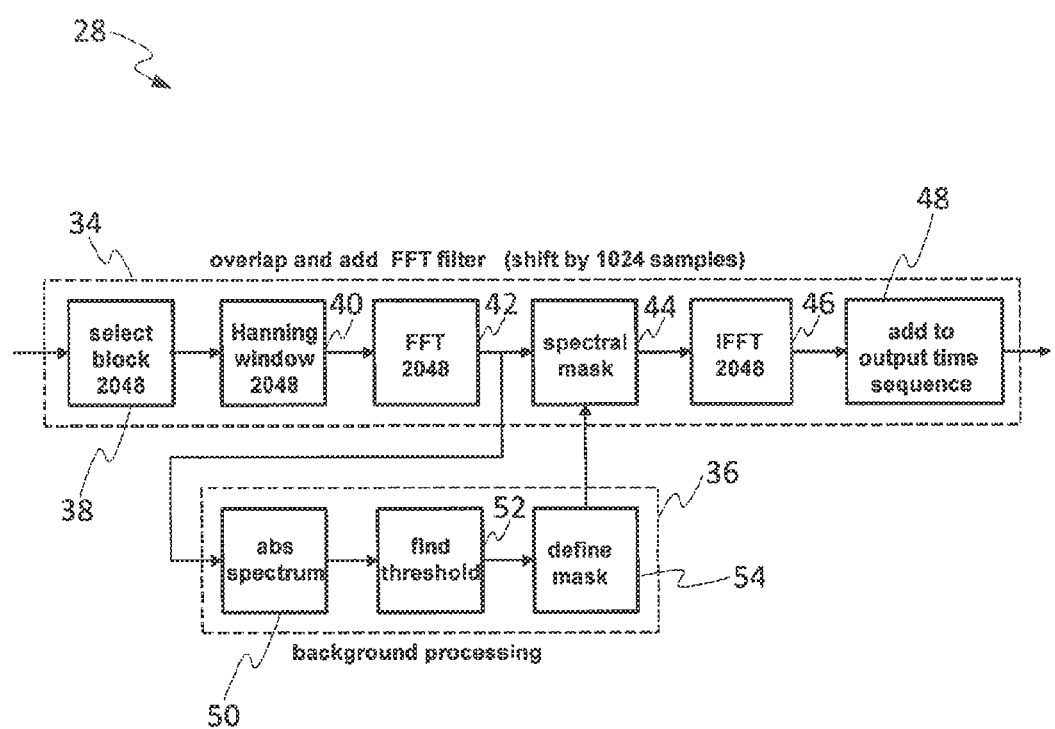
FIG. 4 is a schematic block diagram of in interference canceller.

FIG. 4 gives an example block diagram for implementing the interference cancelling module 28. The interference cancelling module 28 comprises a fast Fourier transform (FFT) filter 34, comprising a block selection module 38, a windowing module 40, a fast Fourier transform (FFT) module 42, a spectral masking module 44, an inverse FFT (IFFT) module 46, and an addition module 48. The interference cancelling module 28 further comprises a background processing module 36, comprising an absolute spectrum module 50, a threshold finder module 52, and a mask definition module 54. The block selection module 38 has an input arranged as the input of the interference cancelling module 28, coupled to the output of the second down-sampling module 26. In turn, the block selection module 38 has an output coupled to an input of the windowing module 40, the windowing module 40 has an output coupled to an input of the FFT module 42, the FFT module 42 has an output coupled to an input of the spectral masking module 44, the spectral masking module 44 has an output coupled to an input of the IFFT module 46, and the IFFT 46 module has an output coupled to an input of the addition module 48. The addition module 48 has an output arranged as the output of the interference cancelling module 28, coupled to the input of the up-sampling module 30. Further, the output of the FFT module 42 is coupled to an input of the absolute spectrum module 50, an output of the absolute spectrum module is coupled to an input of the threshold finder module 52, and output of the threshold finder module 52 is coupled to an input of the mask definition module 54, and an output of the mask definition module 54 is coupled to a further input of the spectral masking module 44.

In operation, the block selection module 38 receives a signal from which interference is to be excised (the matched, filtered, down-sampled signal from the second down-sampling module 26) and divides this signal into portions or "blocks" each of a certain length N samples in the time domain, e.g. N=2048. In embodiments the blocks may overlap in time, e.g. by N/2 samples. Each block of N samples is output to the windowing module 40 which applies a window function to each block respectively, e.g. a raised-cosine window function such as a Hamming window. The windowing module 40 outputs each windowed block to the FFT module 42, which transforms each block from the time domain into the frequency domain, thereby generating a frequency domain representation of each block. The frequency domain representation of a block comprises a plurality of spectral components, i.e. a measure of the signal at each of a plurality of frequency bins. The FFT module 42 passes the frequency domain representation of each block is passed from the FFT module 42 through the spectral masking module 44 which applies a spectral mask to excise interfering components.

To determine the spectral mask, the frequency domain representation of each block is also output from the FFT module 42 to the absolute spectrum module 50 which determines the absolute spectrum of the transformed block, i.e. the absolute values of the components in the block without the effect of phase. Thus the spectral components are represented in terms of the signal strength at each of a plurality of frequency bins (e.g. see FIGS. 5 and 6). In embodiments the signal strength may be represented in terms of power or amplitude (square root of power). The absolute spectrum module 50 outputs the absolute spectrum for the block to the threshold finder module 52 which uses it to determine a spectral density curve for the block, in embodiments either the power spectral density or amplitude spectral density as appropriate to the representation being used.

The spectral density is the expected distribution of signal strength per unit frequency for an idealized random set of data. The shape of the spectral density curve is characteristic of the light coding scheme. So the shape of the spectral density curve for the ternary Manchester scheme will be different than that of a conventional, binary Manchester coding scheme, and different again from other coding schemes. The shape of the spectral density curve for ternary Manchester is shown schematically in FIG. 7, e.g. having a peak at 2 kHz and a null at 4 kHz. The spectral density is also scaled according to the integral of the absolute values of the components in the block—i.e. it represents the proportion of the block's power or amplitude that is expected as a function of frequency. Thus the spectral density curve is dependent on the coding scheme being used to encode the light and on the total signal strength in the block (total power or amplitude).

The threshold finder module 52 modifies the spectral density curve to determine a threshold curve (e.g. threshold 2 in FIG. 6). The mask definition module 50 then determines any components whose signal strength (power or amplitude) exceeds the threshold curve and defines a spectral mask which masks these components in the spectrum of the block. The mask definition module outputs the mask to the spectral masking module 44, which applies the mask so as to excise the masked components from the frequency domain representation of the respective block. The excision works on the basis that any spectral components having signal strength greater than the threshold mask (e.g. threshold 2 in FIG. 6) are likely due (at least in a substantial part) to interfering tones from sources such as PWM luminaires or backlights.

Following interference cancellation, the frequency domain version of each block is passed from the spectral masking module 44 through the IFFT module 46 where the respective block is transformed back into the time domain. The IFFT module 46 outputs each block to the addition module 48 which adds overlapping regions of blocks together to produce a reconstructed time domain signal, but having interference been cancelled. The reconstructed, interference-cancelled time domain signal is then output onwards to the baseband module 32 where the baseband receive processing is performed.

Thus according to the above, the interference cancellation module 28 applies interference excision in the frequency domain using an N-point FFT and IFFT (e.g. N=2048).

In a preferred application, the interference excision is based on an observation that, in the frequency domain, it is possible to distinguish between the continuous spectrum of the wanted signal (resulting from the effectively random bits transmitted) and the discrete spectrum of periodic interferers.

Note that in embodiments, the user data is scrambled by a scrambling code so that the data retains a pseudo random quality regardless of the user data being transmitted. For example, even if the user transmits a stream of consecutive 1s, or consecutive 0s, or some other data that results in an ordered stream of bits, the scrambled stream will still appear effectively random in that it will correspond to an approximately smooth spectrum in the frequency domain. However, even without scrambling most user data is still effectively random over a sufficiently large number of samples (even though the content may not be random, any order in the content does not necessarily manifest itself noticeably in the physical layer).

It has been found that the spectral "holes" created by the excision tend to be relatively few and small compared to the number of components and width of the spectrum of the data. As a result, when transformed back to the time domain after the interference is removed, the distortion in the signal due to this excision is negligible or at least tolerable.

Figure 7:
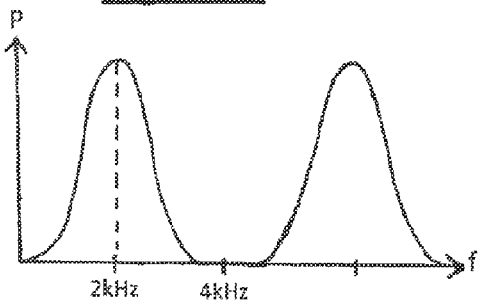
FIG. 7 is a schematic representation of a spectral density curve.

For example, for an FFT of length 2048 samples and a spectrum as illustrated in FIGS. 5-7 with a peak at 2 KHz and null at 4 kHz, there may only be of the order of 10 samples each of width 10 Hz.

It is noted that coded light signal formats may not allow for strong signal restoration algorithms like error correction or spread spectrum. In embodiments, it is desirable to carefully pick the interference excision algorithm and its location among the other receiver algorithms in order to reduce signal distortion. In embodiments, one or more of the following additional measures may optionally be implemented to further improve performance of the interference cancellation disclosed herein:

applying a two-step process for determining the threshold curve, comprising determining components exceeding a first threshold curve, then determining a second threshold curve based on the spectral density with the effect of these components removed;

applying the matched filter before doing frequency-domain interference excision;

applying a time-domain Hanning window before the FFT with N/2 overlap of FFT blocks;

using a shaped (raised cosine) threshold in the frequency domain for distinguishing between wanted spectrum and interference frequencies;

zeroing the end points of the outcome of FFT and IFFT for minimizing the distortion due to fixed point computations; and/or a switch for bypassing the excision algorithm allowing for an exchange between signal processing delay of the receiver and its robustness against interference.

In embodiments, interference excision (removal of interfering frequencies) is applied after the matched filter 18, but before the more traditional baseband receiver algorithms 32 such as carrier sense of power surge detection, clock generation, frame sync detection, and joint clock and data recovery.

Figure 12:
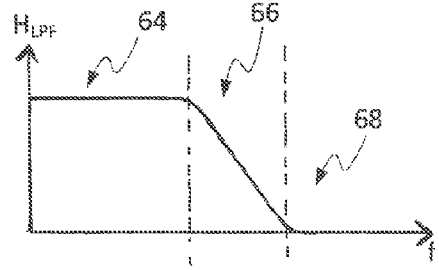
FIG. 12 is a schematic representation of a frequency response of a low pass filter.

The analogue LPF 14 in the analogue front-end 10 is designed to be able to sample its output at 64 kHz without having disturbing aliasing products. At 64 kHz, a matched filter 18 for ternary Manchester is first applied. As a by-product, creates a strong wide null around 0 Hz and 4 kHz (see FIGS. 5-7). The suppression of the signal at low frequencies helps to avoid low frequency (out-of band) interference from sources such as the mains power supply. Further, an advantage of the placing of the matched filter 18 in the chain of FIG. 3 is that the next null (in this example at 4 kHz) can be arranged to coincide with the transition band for the subsequent digital LPF 20. The digital LPF 20 removes all frequencies above 4 kHz, allowing for a downsampling to 8 kHz (according to the Nyquist theorem, to avoid aliasing distortion it is desirable to remove all frequencies that are more than half the sampling frequency). However, as illustrated schematically in FIG. 12, no low-pass filter is perfect and will in reality have a transition band 66 between the pass band 64 and stop band 68. By applying the matched filter 18 before the LPF 20, the null at 4 kHz (for example) can be arranged to be within the transition band 66 of the LPF 20. Further, the interference excision described above involves transforming from the frequency domain to the time domain and back again. This implies it is desirable to have as wide a window as possible in the time domain, which implies wanting a sampling frequency as low as possible. By applying the matched filter 18 before the LPF 20, it is known that the whole spectrum lies between 0 Hz and 4 kHz.

The interference excision takes place at 8 kHz sampling frequency, corresponding to the baseband signal bandwidth of the ternary Manchester physical layer (4 kHz). As mentioned, interference excision takes place in the frequency domain using an N-point FFT and IFFT, e.g. using an FFT of length N=2048 points (consecutive time samples at 8 kHz).

Figure 10:
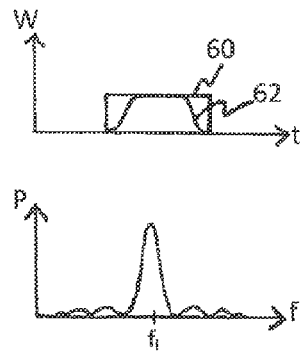
FIG. 10 is a schematic representation of a window functions and their effect on an interfering tone in the frequency domain.

The input is divided into blocks N consecutive time samples. In embodiments each block is multiplied by a window function 40 in the form of a raised cosine window such as a Hamming window (raised cosine with roll-off of 1), the window being of width N in the time domain. Each block is then transformed to the frequency domain using an N-point FFT, resulting in an N-vector of frequencies. A multiplication in the time domain corresponds to a convolution in the frequency domain. Hence in the frequency domain, a discrete interfering tone $f_i$ (e.g. the fundamental or an harmonic of a rectangular wave due to PWM) results in the convolution of a sinusoid with the window function. An example of a rectangular window function 60 and a raised cosine window function 62 are shown schematically at the top of FIG. 10, and an example of a resulting convolution of a window function W with an interfering tone $f_i$ in the frequency domain is illustrated schematically at the bottom of FIG. 10. If the window is discontinuous at its edges, the width of the interfering tone goes with $1/f$ in the frequency domain; if the first derivative of the window is discontinuous at its edges, the width of this tone goes with $1/f_2$; and if the second derivative is discontinuous the width of the tone goes with $1/f_3$. It is desirable to keep the width of these tones as narrow as possible in the frequency domain (to minimize distortion when excised), so it is advantageous to choose a window function which is only discontinuous in its second derivative. A raised-cosine window has this property. A Hamming window is a raised-cosine window parameterized by a roll-off of 1.

Figure 11:
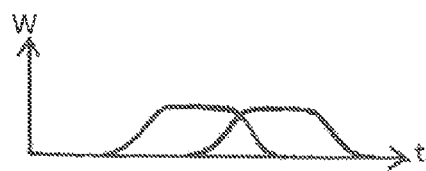
FIG. 11 is a schematic representation of a window function applied to overlapping portions of received data.

In embodiments, the input is divided such that the blocks of N consecutive time samples are overlapping with one another. In the case of a Hamming window (raised cosine with roll-off parameter 1) each block is given an overlap of N/2 samples with its neighboring blocks. The reason for this is illustrated schematically in FIG. 11. The non-rectangular window function has the effect that samples from the edge of the window in the time domain are attenuated. Hence the overlapping regions are arranged to correspond to the regions in which the time domain signal is attenuated by the window function. When the blocks are converted back into the time domain and added together, the overlapping regions combine to undo an effect of the attenuation from the edges of the window function. In embodiments this will recover a flat function in the time domain. For a Hamming window (raised-cosine with roll-off 1) an overlap of half a block (N/2) will have this effect. Alternatively a raised cosine window with roll-off less than 1 can achieve this same effect by arranging the overlap to be less than half, in dependence on the roll-off.

In further embodiments, in the frequency domain, the interference cancelling module 28 may discard the first few and last few components of said N-vector of frequencies. This is because these components tend to be very erratic due to fixed point computations.

Next, the interference cancelling module 28 computes a frequency domain threshold curve as a scalar multiple of a standard threshold curve (the spectral density).

FIG. 5 shows the spectrum of a wanted signal and threshold masks with no interference. The random spectrum as computed using a 2048-point FFT applied to a Hamming-windowed portion (block) of received signal. For each FFT block, a frequency domain threshold curve is computed that will distinguish between the continuous spectrum of the wanted signal and the discrete spectrum of interferers. The frequency domain threshold curve is a scaled version of the power spectral density of ternary Manchester, or a simplified approximation thereof. A raised cosine cantered at 1750 Hz is used as an approximation for the frequencies from 0 to 4 kHz.

The scaling of the frequency domain threshold curve is a linear function of the integral of the computed random spectrum. The scaling is such that in absence of interference, no frequency component crosses the threshold, i.e. no excision takes place.

FIG. 6 shows the random spectrum of a piece of received signal containing both wanted signal and interference signal (240 HZ PWM at SIR=−20 dB). The actual frequency domain threshold curve used for excision is "threshold 2", since in embodiments the desired scaling (and frequencies to be excised) is determined in two steps.

First, a scaling (leading to threshold 1) is obtained by taking a linear function of the integral of the absolute value of the computed random spectrum. That is, the theoretical (expected) spectral density curve for the relevant light coding scheme (e.g. ternary Manchester) is scaled by the total signal strength in the respective block (integral power or amplitude). This may also include a scaling by a certain factor to allow for a certain margin of error (i.e. in practice some legitimate signal components may fall slightly above the theoretical spectral density curve). In embodiments this factor may be 1.2 or 1.3.

Secondly, a second scaling is obtained by applying the same function to a modified absolute value of the computed random spectrum, where the modified absolute value of the computed random spectrum is obtained from the absolute value of the computed random spectrum by setting the spectral components larger than their "threshold 1" equal to zero. That is, the spectral density is now scaled by the total signal strength (integral power or amplitude) with the components falling beyond threshold 1 removed. This may also again include a scaling by a factor to allow a margin of error, e.g. again 1.2 or 1.3. The final excision takes place by setting frequency components equal to zero, whose absolute values are beyond "threshold 2".

In a generalization of the above, the step of applying a threshold, excising components and re-computing the threshold could be repeated again one or more times. I.e. there could be three steps leading to a "threshold 3", etc.

Note that in embodiments, the above computations only have to be done for N/2 (complex) frequency components (0 to 4 kHz), since the spectrum of a real signal is complex conjugate in the frequency domain.

After application of the afore-mentioned frequency-domain excision on each of the FFT blocks, each excised frequency block is transformed back to the time domain using an N-point IFFT, leading to an excised real N-vector in the time domain.

Next, the first few and last few components of said excised real N-vector in the time domain are set to zero, because these components tend to be very erratic due to fixed point computations. Finally, the resulting time domain vector is added to its corresponding place in the output time sequence.

It has been found that, in absence of excision, even a 16 bit fixed point implementation of the FFT and IFFT does not produce significant distortions.

Figure 8:
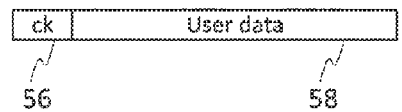
FIG. 8 is a schematic representation of a packet of data as may be transmitted in coded light.
Figure 9:
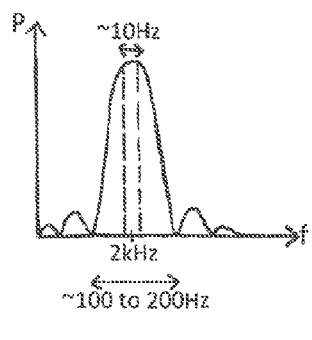
FIG. 9 is a schematic representation of a spectrum of a clock signal received in a packet header.

In embodiments, the coded light data may be transmitted in one or more packets, an example of which is illustrated in FIG. 8. The packet comprises a payload 58 comprising the user data discussed above, and also a header 56 comprising a preamble for use in synchronization. The payload 58 has a length of multiple of the blocks used in the interference cancellation above (e.g. 80 bytes of user data). The preamble comprises a clock signal which may comprise a plurality of cycles of a sinusoid (e.g. 20 cycles at 2 kHz). At first glance, it may seem that the interference cancelling module 28 would have the effect of cancelling this desired clock tone. However, as shown schematically in FIG. 9, in the frequency domain the clock signal corresponds to the convolution of the sinusoid with the rectangular window function created by the length of the preamble (a sinusoid convolved with a rectangular window gives a sink function). This may have a spectral width of the order of 100 to 200 Hz. However, the convolution of this same sinusoidal clock signal with the non-rectangular window function 40 (e.g. raised cosine) corresponds to a much narrower spike being excised, perhaps of the order of 10 Hz in width. Therefore it can be noted that in embodiments, as well as leaving the actual data 58 with negligible or tolerable distortion, the frequency excision discussed above need not destroy a clock signal 56 included in a packet preamble.

It will be appreciated that the above embodiments have been described only by way of example.

For instance, the techniques disclosed herein are not limited to being implemented in terms of any particular measure of signal strength. E.g. signal strength may be expressed in in terms of power or amplitude. Further, it will be appreciated that signal energy accumulated over a given time is a measure of power. Similarly energy spectral density in a finite window of time is a measure of power spectral density. Other ways of representing a signal in light may also be employed. Further, the disclosure is not limited to any particular form of transform such as Fourier transform or FFT. Other kinds of transform will in themselves be familiar to a person skilled in the art, e.g. discrete cosine transform (DCT).

Where the ideas of signals being "discrete" and "continuous" are discussed above, it will be appreciated that that in any digital representation the distinction is somewhat approximate. The spectrum of the (pseudo) random data is continuous in that the strength of spectral components in contiguous bins follows an approximately "smooth" distribution, whereas the interfering tones may be considered discrete in that they result only in non-contiguous individual components (bins) being "picked out" from amongst the continuous spectrum, or perhaps small non-contiguous groups of continuous components being picked out.

Further, where it is said that the strength of a component "exceeds" a threshold or the like, this may refer to either a "greater than" or "greater than or equal to" type operation.

The above has been exemplified in terms of cancelling interference from rectangular waveforms such as PWM light, but in other applications the interference could take other forms, such as sinusoidal interference or other periodic interference. Further, where the interference is "rectangular" includes the possibility of a square waveform.

In embodiments, the interference cancellation comprises completely excising or masking spectral components, by setting their height to zero (setting the value representing strength to zero). However, in alternative embodiments the cancellation may comprise reducing the height of these components to reduce an effect of interference, rather than completely excising them.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A coded visible light receiver comprising: a sensor for receiving light comprising data modulated into the light according to a coding scheme; a transform module configured to transform the data into a frequency domain representation comprising a band of a spectrum resulting from said data being modulated into the light according to said coding scheme; and an interference cancelling module configured to cancel interference occurring in said band by determining that one or more components in said band exceeds a threshold signal strength and cancelling said one or more components in response to said determining, wherein the threshold comprises a curve in the frequency domain, wherein said curve is based on a spectral density being characteristic of the coding scheme used to modulate the data into the light.

2. The receiver of claim 1, wherein the interference cancelling module is configured to perform said determination and said component cancellation by: determining a first threshold curve based on the spectral density, cancelling one or more first components exceeding the first threshold curve, determining a second threshold curve based on the spectral density excluding an effect of the one or more first components, and cancelling one or more second components exceeding the second threshold curve.

3. The receiver of claim 2, wherein the first threshold curve is a linearly scaled version of the spectral density, and the second threshold curve is a linearly scaled version of the spectral density excluding the effect of said first components.

4. The receiver of claim 1, wherein the component cancelling comprises setting the signal strength of said one or more components to zero.

5. The receiver of claim 1, comprising a baseband module and an inverse transform module configured to transform the data back into a time domain representation for further processing by the baseband module after said cancellation of said interference.

6. The receiver of claim 1, comprising a matched filter applied before the transformation into the frequency domain by the transform module.

7. The receiver of claim 1, comprising a low pass filter, wherein the matched filter is applied before the low pass filter and is configured to suppress the spectrum in a transition band of the low pass filter.

8. The receiver of claim 1, comprising a windowing module configured to apply a time-domain window function before the transformation into the frequency domain by the transform module, thereby dividing the data into portions;
wherein the transform module is configured to generate a respective frequency domain representation of a band of the spectrum resulting from each portion of data, and the interference cancellation module is configured to operate on the frequency domain representation of each portion respectively.

9. The receiver of claim 8, wherein the windowing module is configured to divide the data into a sequence of portions in which each portion comprises N time-domain samples, and successive portions overlap by a fraction of the N samples.

10. The receiver of claim 9, wherein said window function comprises a raised cosine window function and said overlap is related to a roll-off of the raised cosine window function.

11. The receiver of claim 1, wherein the transform module is configured to discard end points of said band in the frequency domain before the interference cancellation by said interference cancellation module.

12. The receiver of claim 1, comprising a switch operable to bypass the interference cancellation module.

13. A lighting system comprising:
a device comprising the coded visible light receiver of claim 1; and
a luminaire configured to emit the light, wherein the light is coded visible light.

14. The A non-transitory computer readable medium storing code for operating a coded visible light receiver, the code configured such that, when executed by a processor, the processor performs operations of: in response to a sensor of the coded visible light receiver receiving light comprising data modulated into the light according to a coding scheme, transforming the data into a frequency domain representation comprising a band of a spectrum resulting from said data being modulated into the light according to said coding scheme; and cancelling interference occurring in said band by determining that one or more components in said band exceeds a threshold signal strength and cancelling said one or more components in response to said determining, wherein the threshold comprises a curve in the frequency domain, wherein said curve is based on a spectral density being characteristic of the coding scheme used to modulate the data into the light.

15. A lighting system comprising: a device comprising a coded visible light receiver, the coded light receiver Comprising a sensor for receiving light comprising data modulated into the light according to a coding scheme, a transform module configured to transform the data into a frequency domain representation comprising a band of a spectrum resulting from said data being modulated into the light according to said coding scheme, an interference cancelling module configured to cancel interference occurring in said band by determining that one or more components in said band exceeds a threshold signal strength and cancelling said one or more components in response to said determining, and a luminaire configured to emit the light, wherein the light is coded visible light, wherein at least on occasion, interference that is periodic in time is received by the coded visible light receiver with at least an order of magnitude greater power than the light comprising said data, and/or the light comprising said data is received by the coded visible light receiver via at least one reflection from at least one surface whilst the-interference is received by the coded visible light receiver directly.

16. A coded visible light receiver comprising: a sensor for receiving light comprising data modulated into the light according to a coding scheme: a transform module configured to transform the data into a frequency domain representation comprising a band of a spectrum resulting from said data being modulated into the light according to said coding scheme: and an interference cancelling module configured to cancel interference occurring in said band by determining that one or more components in said band exceeds a threshold signal strength and cancelling said one or more components in response to said determining, wherein the interference cancelling module is configured to perform said determination and said component cancellation by: determining a first threshold curve, cancelling one or more first components exceeding the first threshold curve, determining a second threshold curve excluding an effect of the one or more first components, and cancelling one or more second components exceeding the second threshold curve.

17. The receiver of claim 1, wherein at least a majority of components of said band that originate from said data are at or below said threshold signal strength.

18. The receiver of claim 1, wherein at least a majority of components of said band that originate from said data are at or below said curve.

* * * * *